Feb. 5, 1957 B. FRIEBERG 2,780,479
DRAFT DEVICE ADAPTED FOR ATTACHMENT FORWARDLY
OF A LEADING VEHICLE REAR AXLE
Filed Feb. 16, 1953 3 Sheets-Sheet 1

Inventor
Bengt Frieberg
by Sommers & Young
Attorneys

Feb. 5, 1957 B. FRIEBERG 2,780,479
DRAFT DEVICE ADAPTED FOR ATTACHMENT FORWARDLY
OF A LEADING VEHICLE REAR AXLE
Filed Feb. 16, 1953 3 Sheets-Sheet 3

Inventor
Bengt Frieberg
by Sommers & Young
Attorneys

United States Patent Office 2,780,479
Patented Feb. 5, 1957

2,780,479

DRAFT DEVICE ADAPTED FOR ATTACHMENT FORWARDLY OF A LEADING VEHICLE REAR AXLE

Bengt Frieberg, Ringstorp, Sweden, assignor to Lihnell Vagn Aktiebolag, Ringstorp, Sweden Application February 16, 1953, Serial No. 337,121

1 Claim. (Cl. 280—446)

The present invention relates to a draft device connected to a tractor or some other tractive vehicle and hingeable to a trailer, a plow or some other trailed object, for instance agricultural or ground-working implements exerting, under load, a downwards pressure on the tractive vehicle. Draft devices of this kind comprise at least three joints or members allowing the pivoting of the trailer both in vertical and horizontal direction, and a draw bar turnable about its own longitudinal axis, the torsional axes of said joints being one transversal, one vertical and one longitudinally extending torsional axis. A frame carrying a draft device is connected to the tractive vehicle through the transversal torsional axle, which should be provided to the front of and below the rear axle of the vehicle. The remaining two joints constitute a rigid lever in the common vertical, longitudinally extending plane, whereby they are able to transmit the downwards pressure from the draft device of the trailed object to the transversal joint which, as already mentioned, should be arranged below and to the front of the rear axle of the tractive vehicle. The main purpose is to prevent the rearing of the vehicle which may otherwise means deadly risks to the driver.

In fact, if the tractive vehicle can be loaded with a certain permitted weight, its driving wheels will get a firmer grip in the ground than without such a weight load, which will eliminate the tendency of the driving wheels towards sliding when a heavy object is to be hauled. Besides, this loading of the tractive vehicle with a certain weight involves the advantage that the load capacity of the trailer is considerably increased. Thus, a larger ground friction on the driving wheels of the vehicle and a higher payload capacity of the trailer are obtained. With the draft devices hitherto known, however, it is very riskful to load down the vehicle to the extent mentioned, particularly as far as tractors are concerned, because the vehicle thereby gets a very pronounced tendency towards rearing, which will also reduce or completely eliminate the dirigibility of the vehicle. Only the use of a draft device according to the present invention can eliminate these drawbacks, since the greater the part of the trailer gross weight which can be transmitted to the vehicle, the lesser the tendency of the vehicle towards rearing. For this reason the trailer or the trailed object should be so designed that the permitted maximum portion of the load, and the resistance respectively, is transmitted to the vehicle.

Thus the draft device according to the invention is provided with means for preventing the rearing of the tractive vehicle.

Its main feature it that the horizontally pivoting joint of the trailer or trailed object is located at the rear end of a frame carrying the draft device and sufficiently far to the rear to allow the necessary horizontal elevation of the trailer, and the arrangement is as follows: A draw bar is rigidly secured to the front portion of the trailer, and the bar part adjacent the trailer is completely or partly enclosed by a horizontally turnable sleeve or bearing half vertically journalled in the rear end of the frame. The foremost, free end of the draw bar is provided with a pressure roller or slide shoe running between two uniform, transversal, arc-shaped guide rails placed parallely one above the other in the front portion of said frame, the draw bar being turnable about its longitudinal axis but undisplaceable in the longitudinal direction in order to absorb tractive and braking forces arising through the forewards and backwards movements of the interconnected tractive vehicle and trailer, the draw bar furthermore transmitting, mainly via the pressure roller or slide shoe, the downwards pressure from the trailer to the guide rails, which are located relatively far forwards on the frame, and thus also to a joint for the frame below and to the front of the rear axle of the tractive vehicle, the latter joint allowing the vertical pivoting. The said two guide rails may be replaced by a single arc-shaped rail, against the two plane faces of which a bifurcated or guiding extension of the draw bar end is sliding or running by means of rollers. Other features of the invention will appear from the following description.

In order to clarify the elementary principle of the invention as well as its objects, the following text will describe some embodiments thereof, further features of the invention being disclosed at the same time.

The description refers to the accompanying drawings, in which.

Figure 1:
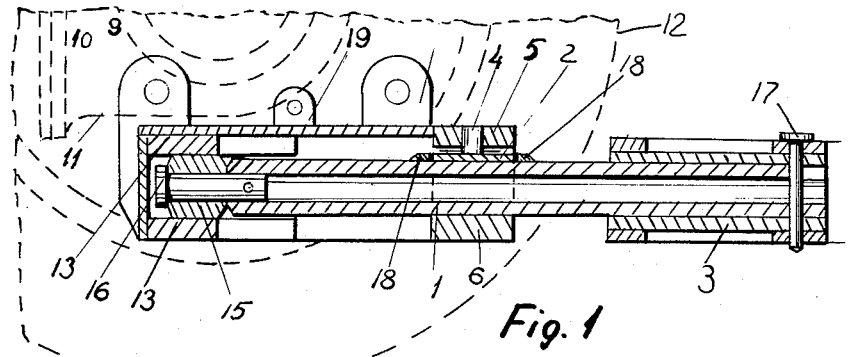
Fig. 1 is a side view in vertical and longitudinal section along the line I—I in Fig. 2 of a first embodiment of the draft device, connected to the rear portion of a tractor which is indicated by dash lines.
Figure 2:
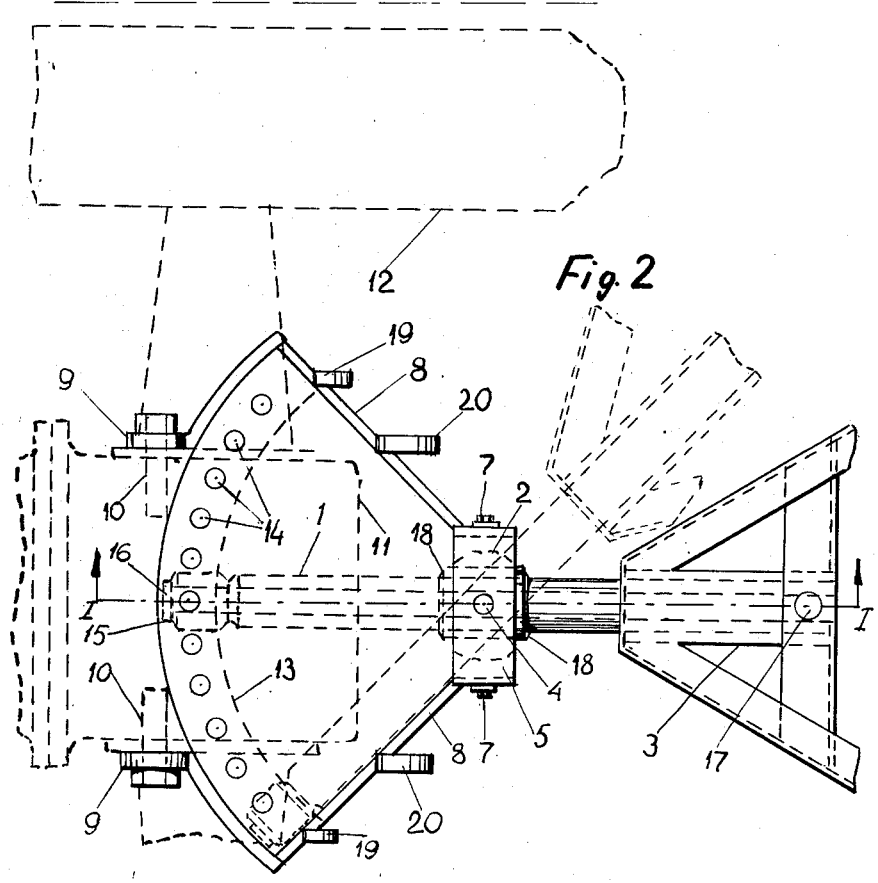
Fig. 2 is a plan view of the same device.
Figure 3:
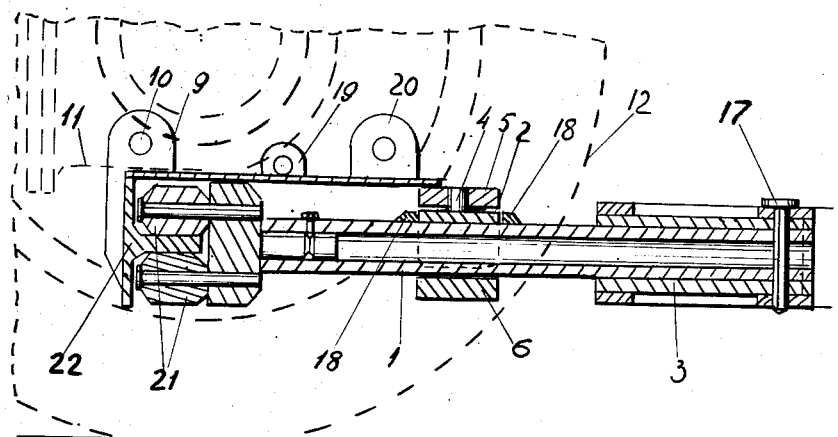
Figs. 3 and 4 are side views in vertical longitudinal section of two further embodiments.

The embodiments illustrated in Figs. 1, 2 and 3 comprise a draw bar 1, which is rigidly secured in a rear sleeve 3 and enclosed by a bearing clamp 2. Said bearing clamp 2 is provided with a vertical journal 4 pivoted in a cross piece 5. The lower cross piece 6 can be detached by removing dowels 7 (see Fig. 2) to effect a quick connection and disconnection of the trailer and the trailed object respectively. The cross piece 5 is uniting two longitudinally extending flat irons or bars 8 (see Fig. 2) standing on their edges, so that the parts 5 and 8 are forming together a stirrup-shaped frame. In its front portion said frame is provided with two upstanding lugs 9 in which are journalled two transversal pins 10 with coinciding axes and secured to the rigid, rear chassis 11 of the tractor, said chassis constituting the middle portion for the rear tractor axle, which is carried by the rear wheels 12. The rear portion of the tractor is indicated by dash lines. The bars 8 are connected at their front with two arc-shaped, transversal guide rails 13 arranged one above the other, the arc centers of which are lying on the axis line of the journal 4. Each guide rail is provided with a row of holes 14, the holes of one rail corresponding to those of the other rail, in which holes dowels can be inserted to fix the draw bar 1 in various horizontal angular positions when the device is used for hauling implements only, in which case a horizontal articulation at the journal 4 is undesired. The front end of the draw bar 1 is provided with a pressure roller 15 running between the guide rails 13. The roller 15 is journalled on a shaft pivot, which is secured to the front end of the draw bar 1 and has a shoulder 16. The sleeve 3 is rigidly secured to the trailer and the implement respectively, and the draw bar 1 in turn is rigidly and, consequently, undisplaceably secured in said sleeve by means of a dowel 17, which absorbs the braking and tractive forces. On its top side the draw bar 1 carries two stop lugs 18, one situated before and one after the bearing clamp 2. These stop lugs also serve to absorb the braking and tractive forces. Suspension lugs 19 are provided for co-operation with possible hydraulic lifting arms on the vehicle in order to facilitate the connection and disconnection of the trailer or the implement. Other lugs 20 are provided for co-operation with possible supporting bars 25 on the tractive vehicle to carry the frame during hauling exclusively (see Fig. 4). A possible downwards pressure from the front portion of the trailer or implement is transmitted to the pins 10 substantially via the roller 15 and the lower guide rail 13. The pins 10 are placed below and before the rear axle of the tractive vehicle, the transmitted downwards pressure thus reducing the risk of this vehicle rearing.

The embodiment shown in Fig. 3 is of the same design as that illustrated in Fig. 1 with the exception that the pressure roller or slide shoe 15 is replaced by a fork provided with pressure rollers or slide shoes 21 running on either side of a single arc-shaped guide rail 22.

Figure 4:
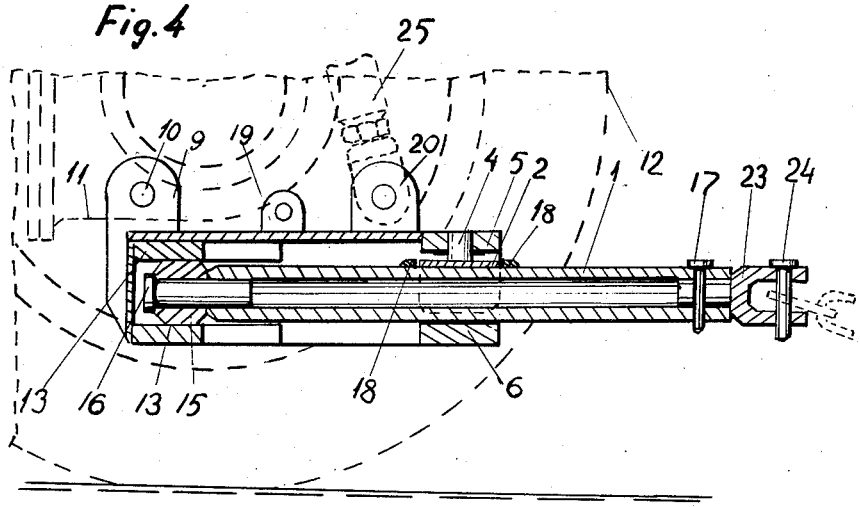

Fig. 4 shows the draft device according to Fig. 1 as arranged for hauling only, to which end a bifurcated connector 23 with a special coupling dowel 24 has been secured to the rear end of the draw bar 1 by means of the dowel 17. In the figure, the lugs 20 are shown to be connected to supporting bars 25 provided on the tractive vehicle, which bars generally can be lengthened or shortened by means of a special screw device in order to carry the draft device in such a manner that the latter will not be dragged along the ground or may be adjusted to a desired vertical position.

Figure 6:
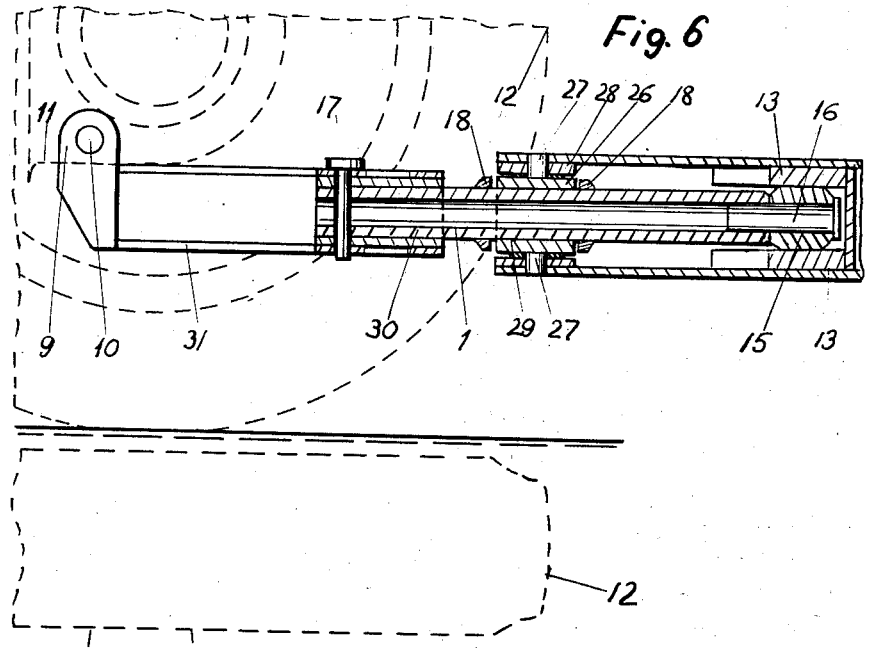
Fig. 6 is a vertical longitudinal section of the same device, the section taken along the line VI—VI in Fig. 5.
Figure 5:
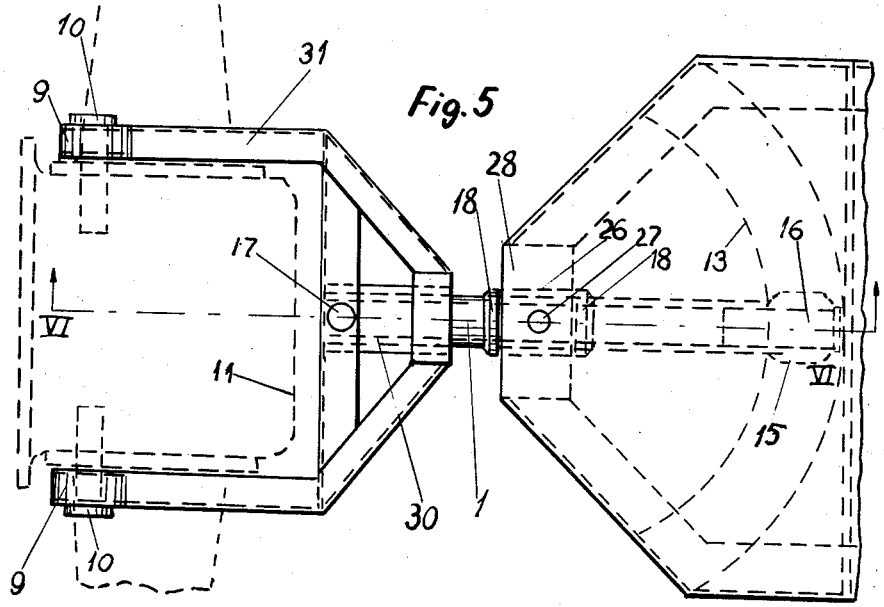
Fig. 5 is a plan view of a still further embodiment of the draft device.

Figs. 5 and 6 illustrate a further embodiment of the draft device, which is connected to the tractor and is in essential respect similar to the device shown in Fig. 1. However, the arc-shaped guide rails 13 are disposed in the front portion of the trailer or trailed object. The bearing clamp 2 shown in Fig. 1 is in Fig. 6 given the shape of a sleeve 26 enclosing the draw bar and having two vertical journals 27 with coinciding axes. Said journals are mounted in two cross pieces 28 and 29 fitted on the front portion of the trailer or trailed object. The dowell 17 secures the draw bar 1 to a sleeve 30, which extends along the longitudinal centre line of a U-shaped stirrup and is in turn secured at the rear of said stirrup, the forwardly projecting shank ends 31 of which are hinged on the pins 10, the latter being fastened to the chassis of the tractive vehicle in the same way as in Fig. 1.

The draft device according to the present invention is not confined to the embodiments described in the specification and illustrated in the drawings, but may be varied in many respects without abandonment of the inventional spirit. By way of example, the device for turnability of the draw bar 1 about its own axis described above and illustrated in Figs. 1, 2 and 3 may be replaced by an arrangement, in which the draw bar is mounted turnably about its axis but undisplaceably in the sleeve 3, in which case the draw bar may have shaft pivots 4 directly welded thereto or otherwise secured, whereby the bearing clamp 2 can be dispensed with.

I claim:

In a traction coupling between a tractor vehicle, and a trailer, the load of which is partly carried by the tractor vehicle, the combination of a cylindrical drawbar, a socket enclosing one of the ends of said drawbar, means for releasably locking said end of said drawbar in said socket against axial and angular movements, a sleeve rotatably surrounding a portion of said drawbar located intermediate the ends thereof, means on said drawbar preventing axial displacement of said sleeve along said drawbar, a frame-structure embracing said sleeve and the end of said drawbar remote from said socket, vertical pivot means swingably attaching said sleeve to one end of said frame to allow horizontal swinging of said drawbar, curved rail means having its center of curvature at the axis of said vertical pivot means and located near the end of said frame opposite said pivot means, roller means mounted on the end portion of said drawbar remote from said socket, said roller means being arranged to run along said rail means for defining the vertical position of said drawbar relatively to said frame and a plurality of horizontal pivot means for securing one end of the coupling to said tractor vehicle below and in front of the rear axle of said tractor vehicle, the other end of said coupling being rigidly secured to the trailer.

References Cited in the file of this patent

UNITED STATES PATENTS

| | | |
|---|---|---|
| 1,654,417 | Foley | Dec. 27, 1927 |
| 1,780,503 | Paul | Nov. 4, 1930 |
| 2,232,407 | Riesterer | Feb. 18, 1941 |
| 2,622,890 | Moses | Dec. 23, 1952 |